United States Patent
Paunonen et al.

(10) Patent No.: US 10,788,819 B2
(45) Date of Patent: Sep. 29, 2020

(54) USER INTERFACE, INDUSTRIAL AUTOMATION SYSTEM AND METHOD

(71) Applicant: Valmet Automation Oy, Espoo (FI)

(72) Inventors: Hannu Paunonen, Espoo (FI); Jouni Ruotsalainen, Espoo (FI); Lauri Lehtikunnas, Espoo (FI)

(73) Assignee: VALMET AUTOMATION OY, Espoo (FI)

( * ) Notice: Subject to any disclaimer, the term of this patent is extended or adjusted under 35 U.S.C. 154(b) by 30 days.

(21) Appl. No.: 16/162,877

(22) Filed: Oct. 17, 2018

(65) Prior Publication Data

US 2019/0113909 A1 Apr. 18, 2019

(30) Foreign Application Priority Data

Oct. 18, 2017 (EP) .................................. 17196971

(51) Int. Cl.
*G05B 23/02* (2006.01)
*G05B 19/042* (2006.01)

(52) U.S. Cl.
CPC ..... *G05B 23/0216* (2013.01); *G05B 19/0425* (2013.01); *G05B 2219/25067* (2013.01)

(58) Field of Classification Search
CPC ............ G05B 23/0216; G05B 19/0425; G05B 2219/25067
See application file for complete search history.

(56) References Cited

U.S. PATENT DOCUMENTS

| | | | |
|---|---|---|---|
| 5,631,825 A | 5/1997 | van Weele et al. | |
| 8,050,782 B2* | 11/2011 | Fallman | G05B 19/409 700/245 |
| 2010/0050103 A1* | 2/2010 | Husoy | G06F 3/0484 715/765 |
| 2010/0107108 A1* | 4/2010 | Husoy | G06F 3/0484 715/777 |
| 2012/0259436 A1 | 10/2012 | Resurreccion et al. | |
| 2013/0031514 A1* | 1/2013 | Gabbert | G06F 3/04883 715/863 |
| 2014/0081430 A1 | 3/2014 | Timsjo et al. | |

(Continued)

OTHER PUBLICATIONS

Partial European Search Report issued by the European Patent Office in relation to European Application No. 17196971 dated Jul. 19, 2018 (3 pages).

*Primary Examiner* — Vincent H Tran
(74) *Attorney, Agent, or Firm* — Robert P. Michael, Esq.; Carter, DeLuca & Farrell LLP

(57) ABSTRACT

An industrial process is monitored and controlled by displaying at least one process page in a process page window, providing an operator configurable region, and providing at least one item display element representing at least one process component, sub-process or operation on the process page and being movable on top of the operator configurable region. A movement of the item display element from the process page on to the operator configurable region is determined, and the operator configurable region is caused to display a corresponding docked display element in the operator configurable region. The docked display element is configured to enable control of the process component, sub-process or operation the docked display element represents from the operator configurable region.

15 Claims, 7 Drawing Sheets

(56) References Cited

U.S. PATENT DOCUMENTS

2014/0277620 A1     9/2014  Nixon et al.
2017/0371528 A1*   12/2017  Cupitt .................. G06F 1/1605
2018/0074660 A1*    3/2018  Nixon ................. G06F 3/04817

* cited by examiner

USER INTERFACE, INDUSTRIAL AUTOMATION SYSTEM AND METHOD

CROSS-REFERENCE TO RELATED APPLICATIONS

This Application claims priority to European Application No. 17196971.0, filed Oct. 18, 2017 the entire disclosure of which is incorporated herein by reference.

BACKGROUND

The invention relates to industrial process environments, and more particularly to industrial automation system, graphical user interface and method in connection with industrial process control systems for monitoring and/or controlling industrial process environments.

Graphical user interfaces are used in connection with industrial process environments and related industrial process control systems especially for monitoring and controlling components and operations of the systems. Such graphical user interfaces may comprise a main process page window for displaying a graphical illustration of the industrial process and additional windows or views arranged to display a graphical illustration of at least one sub-process, operation and/or component of the industrial process. In such a graphical user interface for industrial process control systems a graphical illustration of the industrial process, at least one sub-process or at least one process component may represent a respective process, sub-process or process component and be operationally connected thereto. Thereby the graphical illustration of the industrial process, sub-process or process component may be arranged to provide at least one of monitoring and controlling of an operation related to the respective process, sub-process or process component. Thus, through that respective graphical illustration in the graphical user interface may be used to monitor and/or control the respective industrial process, sub-process or component.

The graphical illustrations of the industrial processes, sub-processes and process components may be provided with data items describing information for instance about variables to be measured, set values for the variables to be measured and/or indications about abnormal situations, such as alarms, in the operation of the industrial process. A problem relating to the presently available industrial process control systems and graphical user interfaces used therein is, however, that a way of presentation of the information describing the operation of the process, sub-process or process component is fixed.

BRIEF DESCRIPTION

An object of the present invention is to provide a new graphical user interface, industrial automation system and method for monitoring and controlling an industrial process. The objects of the invention are achieved by a method and an arrangement which are characterized by what is stated in the independent claims. Preferred embodiments of the invention are disclosed in the dependent claims.

The invention is based on the idea of providing an operator configurable region that can be configured by selecting display elements to be shown in the operator configurable region and then be used independently or displayed simultaneously with at least one process page window.

An advantage of such solution is that the display elements that are most important or that are necessary for implementing a certain operation or a work flow in connection with an industrial process can be shown independently from any specific process page windows and without their limitations.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Same or similar reference signs identify like elements in the figures.

DETAILED DESCRIPTION OF THE INVENTION

Figure 1:
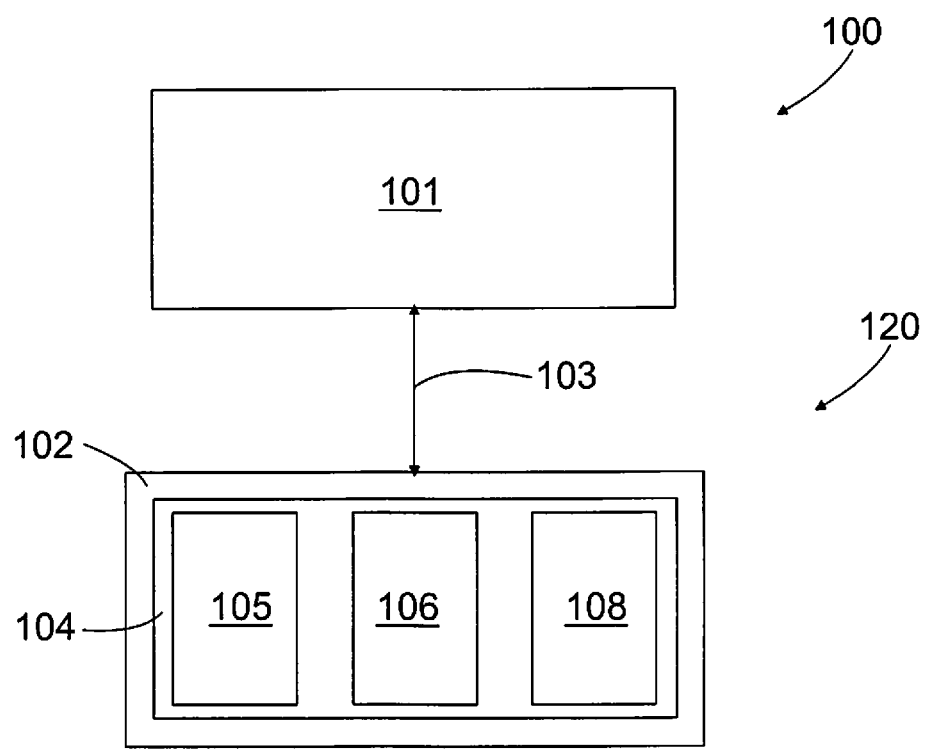
FIG. 1 is a schematic illustration of an operating environment of an industrial process.

FIG. 1 is a schematic illustration of an industrial process environment 100. The industrial process environment 100 comprises at least one industrial process 101.

The industrial process environment 100 may further comprise an industrial automation system for monitoring and/or controlling the at least one industrial process 101. The industrial automation system may comprise a user interface 102 for controlling and monitoring the at least one industrial process, such as for controlling and/or monitoring at least one sub-process, operation and/or component of the industrial process 101. The industrial process environment may further comprise a data-communication network 103 for information and/or data transfer between the industrial process 101 and the user interface 102. The user interface 102 may comprise hardware and/or software means for providing the monitoring and control of the industrial process 101.

The hardware of the user interface 102 may comprise a control unit, such as a process control computer, and at least one input/output unit formed as a part of the control unit or being connected to the control unit for providing input and/or output providing connections between an operator of the industrial process, the user interface 102 and the industrial process 101, to present process monitoring information to the operator and/or to receive process control information provided by the operator.

The hardware of the graphical user interface 102 may also comprise a memory for storing information related to the industrial process and monitoring and control operations thereof. The memory may be provided as a part of the control unit or the memory may be separate from the control unit. In various embodiments, the memory may include volatile and/or non-volatile memory and typically stores content, data, or the like. For example, the memory may store computer program code such as software applications or operating systems, information, data, content, templates or the like for the processor to perform steps associated with operation of the user interface, industrial automation system and method in accordance with embodiments. The memory may comprise, for example, random access memory (RAM), a hard drive, or other fixed data memory or storage device. Further, the memory means, or part of it, may be removable memory detachably connected to the control unit. According to an embodiment, the memory may be provided at a remote location at a distance from the control unit.

The process monitoring information mentioned above may comprise for instance exact numerical data or information may presented visually or audibly. Devices for presenting process monitoring information may comprise at least one display means for displaying for instance numerical or graphical information or real-time video information describing the operation of the industrial process or a specific part or point therein, such as a sub-process, operation or component, and/or audio means for producing alarm sounds and/or real time sound information recorded at the industrial process at a specific part or point therein, for example.

The process control information may comprise for instance exact numerical values, such as set values for process control, or additional information describing the operation of the process, such as textually or orally presented notes to be stored into the memory. The devices for inputting process control information may comprise a keyboard, a joystick, touchscreen, a camera and a microphone, for instance.

The software of the user interface 102 may comprise for instance an operating system of the control unit and/or data-communication control software for controlling the data communication between the operator, the industrial process 101 and the user interface 102, as well as between the user interface 102 and devices used either to represent process monitoring information to an operator of the industrial process or to receive process control information provided by the operator. The software of the user interface 102 may further comprise software for providing a graphical user interface of the industrial process 101.

Hardware and software means and user interfaces used in connection with industrial automation systems are generally known for a person skilled in the art and therefore their structure and operation are not described herein in more detail.

Figure 2A:
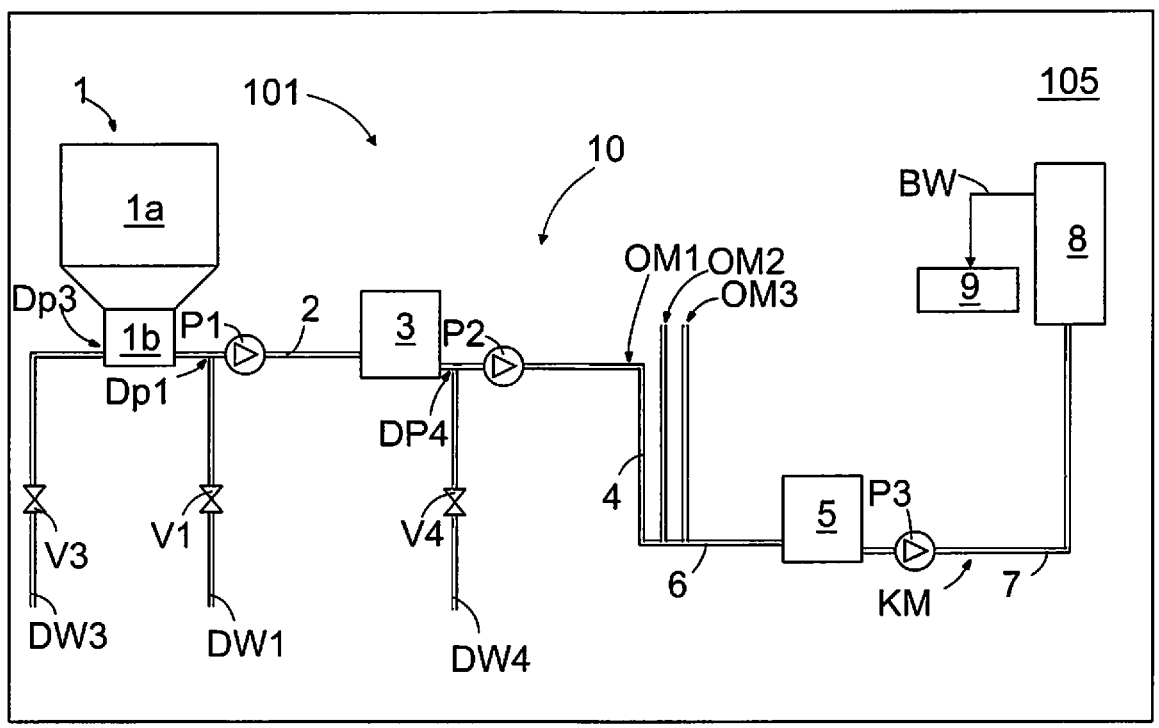
FIG. 2a is a schematic illustration of a main process page window for displaying a graphical illustration of an industrial process.

The user interface 102 may further comprise a graphical user interface 104 for controlling and monitoring sub-processes, operations and components in the industrial process 101. The graphical user interface 104 may comprise at least one process page window illustrating the industrial process and possibly at least one sub-process and/or component, typically multiple sub-processes and/or components thereof. According to an embodiment, the graphical user interface 104 may comprise at least two process page windows. One of these process page windows of the graphical user interface 104 may comprise a main process page window 105 arranged to illustrate or display a graphical illustration of the industrial process 101. FIG. 2*a* discloses schematically a main process page window 105 of an industrial process 101.

Figure 2B:
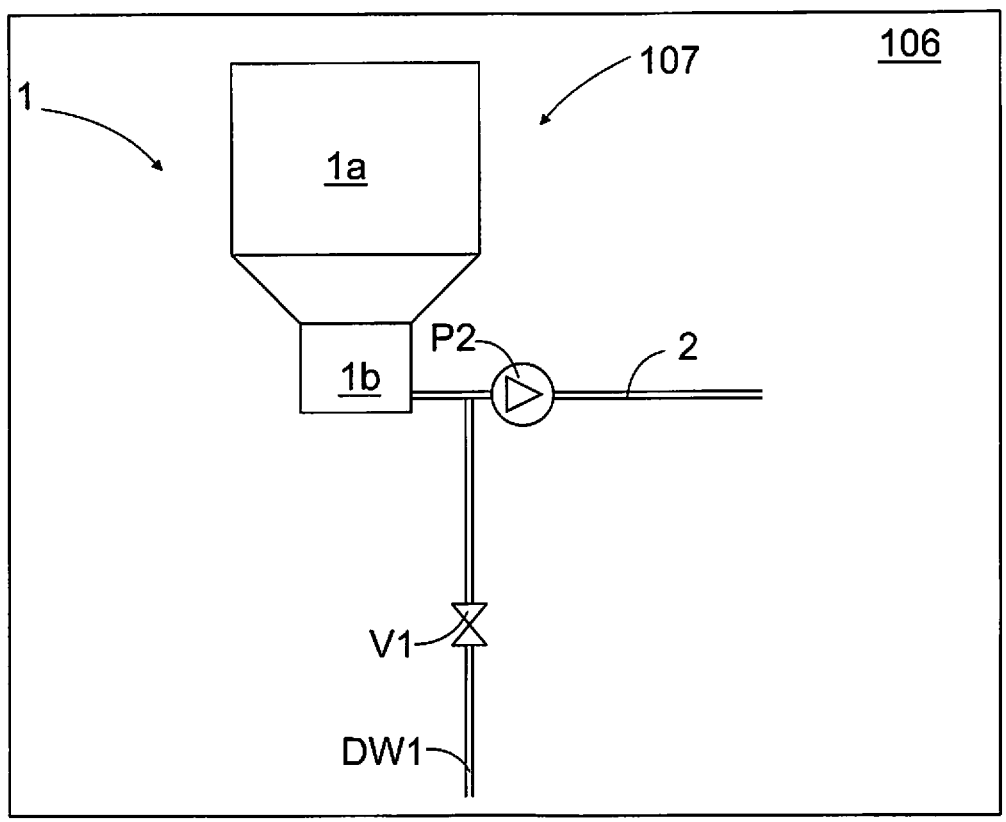
FIG. 2b is a schematic illustration of an auxiliary process page window for displaying a graphical illustration of a sub-process of the industrial process.

According to an embodiment, the graphical user interface 104 may further comprise at least one auxiliary process page window, preferably multiple auxiliary process page windows. At least one of the auxiliary process page windows may be arranged to display a graphical illustration of at least one subprocess of the industrial process 101 and/or at least one process component of the industrial process 101. FIG. 2*b* discloses schematically a first auxiliary process page window 106 for displaying a graphical illustration of a sub-process 107 of the industrial process 101 according to an embodiment, and FIG. 2*c* discloses schematically a second auxiliary process page window 108 for displaying a graphical illustration of a process component 109 of the industrial process 101 according to an embodiment.

The graphical illustration of the industrial process 101, at least one sub-process 107 and/or at least one process component 109 may be operationally connected to the respective process 101, sub-process 107 or process component 109 for providing at least one of monitoring and controlling of an operation of the respective process 101, sub-process 107 or process component 109 through the respective graphical illustration in the graphical user interface 104. Furthermore, the at least one process page window, such as the main process page window 105, the at least one first auxiliary process page window 106 and/or the at least one second process page window 108, may comprise at least one operator configurable region 110 to be displayed on the at least one process page window.

The graphical user interface 104 may be configured to display at least one docked display element 30 representing at least one process component 109, sub-process 107 or operation of the industrial automation system for enabling control of the respective one process component 109, sub-process 107 or operation in response to the operator adding at least one corresponding item display element 33 to be included in the operator configurable region 110. In this context, an item display element 33 refers to display elements of the graphical user interface 104 provided as a part of a process page window 105, 106, 108 and representing at least one process component 109, sub-process 107 or operation of the industrial automation system and enabling control of the respective one process component 109, sub-process 107 or operation. In this context, a docked display element 30 refers to display elements of the graphical user interface 104 added to the operator configurable region 110. In other words, the user may add an item display element 33 to be included in the operator configurable region 110 in a manner described in this description. Then, the display element representing the same process component 109, sub-process 107 or operation and shown within the operator configurable region 110 of the graphical user interface 104 is called a docked display element 30. In this description, an item display element 33 and a docked display element 30 representing the same process component 109, subprocess 107 or operation are also called corresponding display elements and a docked display element 30 is said to represent the corresponding item display element 33 in this description.

According to an embodiment, an item display element 33 and a docked display element 30 representing the same process component 109, sub-process 107 or operation may have a same appearance. According to another embodiment, the appearance of a docked display element 30 may be different from the appearance of a corresponding item display element 33 representing the same process component 109, sub-process 107 or operation. The appearance, such as the size, shape or colouring, of the docked display element 30 may be adjusted to better fit the operator configurable region 110 or to show some additional information, for example.

According to an embodiment, the item display element 33 and/or the docked display element 30 may also be configured to visualize information describing the operation of the respective operation, sub-process 107 and/or process component 109.

FIG. 2a is a schematic illustration of a main process page window 105 for displaying a graphical illustration of an industrial process 101. The industrial process 101 displayed in the main process page window 105 of the graphical user interface 104 shown schematically relates to paper manufacturing and illustrates schematically a stock preparation department 10 for a paper machine 8, in other words stock production and dosing line for a paper machine 8 and the paper machine 8. This embodiment is described as an example only and it is clear for a person skilled in the art that the user interface, the industrial automation system and method may be used in connection with many different types of industrial processes.

In the embodiment of FIG. 2a, machine stock KM to be fed to the paper machine 8 is composed of three component stocks OM1, OM2 and OM3, which are mixed with each other. For the sake of clarity, the dosing line of only the first component stock OM1 is shown in its entirety. The dosing lines of the second component stock OM2 and the third component stock OM3 are substantially similar. The dosing line for component stock OM1 includes a stock tower 1 acting as the storage chest for component stock OM1. From the stock tower 1, component stock OM1 is fed with a first pump P1 along a feeding pipe 2 to a component stock chest 3 acting as a dosing chest. From the component stock chest 3, component stock OM1 is fed with a second pump P2 along a dosing pipe 4 to a main line 6 in the stock preparation, leading to a blending/machine chest 5, to which main line 6 components stocks OM2 and OM3 are led in the same way. The component stocks OM1, OM2 and OM3 start to blend with each other in the main line 6, but more efficient blending of the component stocks OM1, OM2 and OM3 occurs only in the blending/machine chest 5, where efficient blenders are used to blend the component stocks OM1, OM2 and OM3 with each other. From the blending/machine chest 5, the machine stock KM composed of the component stocks OM1, OM2 and OM3 is fed with a third pump P3 along a machine stock dosing pipe 7 to the short circulation of the paper machine 8 and further to a headbox for feeding the paper stock to a wire section of the paper machine 8.

If a basis weight BW of paper is being adjusted, a basis weight adjustment unit 9 requests for a necessary fiber flow or machine stock KM flow to the paper machine 8, which depends on a consistency of the paper stock. The consistency of the paper stock fed into the wire section of the paper machine 8 typically varies between 0.3 and 1.5%. At an upper section 1a of the stock tower 1, whereto new component stock OM1 is fed, the consistency of component stock OM1 is typically 10 to 14%. Thus, component stock OM1 has to be diluted before being pumped to the paper machine 8. The component stocks OM1, OM2 and OM3 are diluted by addition of dilution water into the stock in such a manner that the consistency of the machine stock KM to be fed in due course into a short circulation of the paper machine 8 is about 3%.

FIG. 2a further shows the dilution of component stock OM1 with dilution water fed immediately after the stock tower 1 at a blending point DP1 to the suction side of the first pump P1 via an adjusting valve V1 and a dilution water duct DW1. At this point, the consistency of the stock is diluted from a consistency level of 10 to 14% to a level of 5 to 6%. After the component stock chest 3, component stock OM1 is further diluted with dilution water fed at a blending point DP2 to the suction side of the second pump P2 via an adjusting valve V2 and a dilution water duct DW2, typically to a level of 3.2 to 3.5%. The component stock dosing line may comprise a plurality of successive component stock chests and, after them, blending points, but for the sake of clarity FIG. 2a only shows one component stock chest 3. One more stock dilution step is usually arranged between the physically separate blending and machine chests. Component stock OM1 can also be diluted in a lower section 1b of the stock tower 1 by recycling the stock and adding dilution water to component stock OM1 at a blending point DP3 via an adjusting valve V3 and a dilution water duct DW3.

Figure 2C:
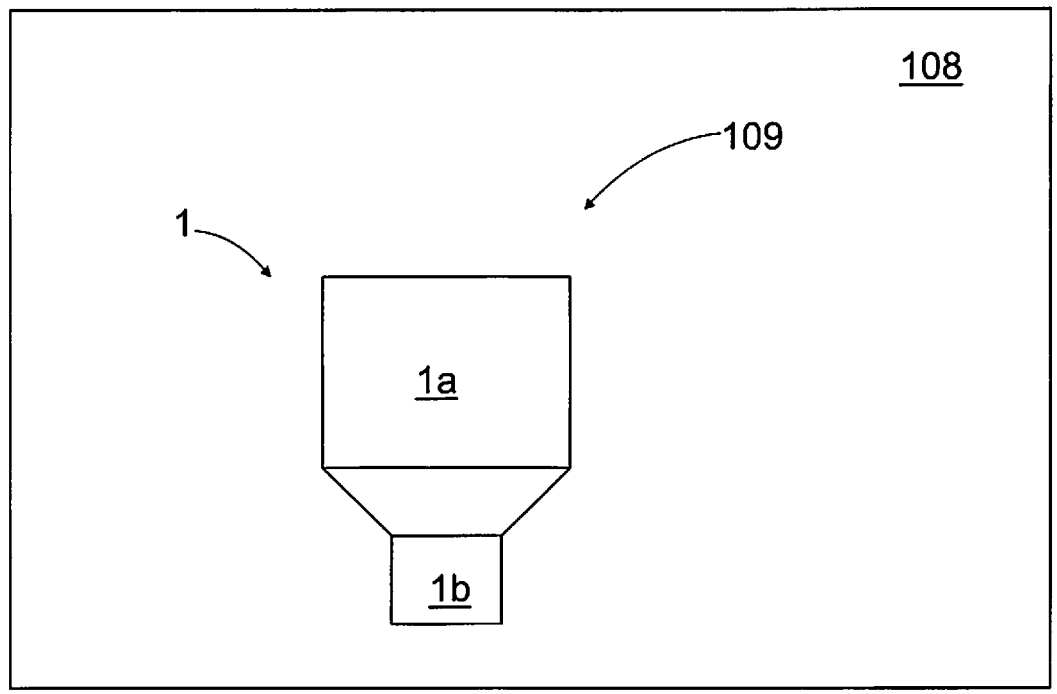
FIG. 2c is a schematic illustration of an auxiliary process page window for displaying a graphical illustration of a process component of the industrial process.

FIG. 2b is a schematic illustration of a first auxiliary process page window 106 for displaying a graphical illustration of a sub-process 107 of the industrial process 101, the sub-process 107 in this example being a dilution process for dilution of the component stock OM1 flowing out of the stock tower 1. FIG. 2c is a schematic illustration of a second auxiliary process page window 108 for displaying a graphical illustration of a process component 109 of the industrial process 101, the process component 109 being in this example the stock tower 1.

The stock production and dosing line 10 for a paper machine 8, as well as the paper machine 8, disclosed in FIGS. 2a, 2b, 2c provides only an example of an industrial process environment wherein the industrial automation system and the industrial process control system described herein may be utilized. The actual operation of the stock production and dosing line 10 or the paper machine 8 is not relevant for the solution described herein. Therefore, the actual operation of the stock production and dosing line 10 or the paper machine 8 or actual monitoring or control operations therein are not considered herein in more detail.

At least one of the main process page window 105, the first auxiliary process page window 106 and the second auxiliary process page window 108 further comprises at least one operator configurable region 110 to be displayed at the respective process 2, sub-process 7 and/or process component 9 for visualizing information describing the operation of the process 2, sub-process 7 and/or process component in response to a selection of the information to be displayed.

Figure 3:
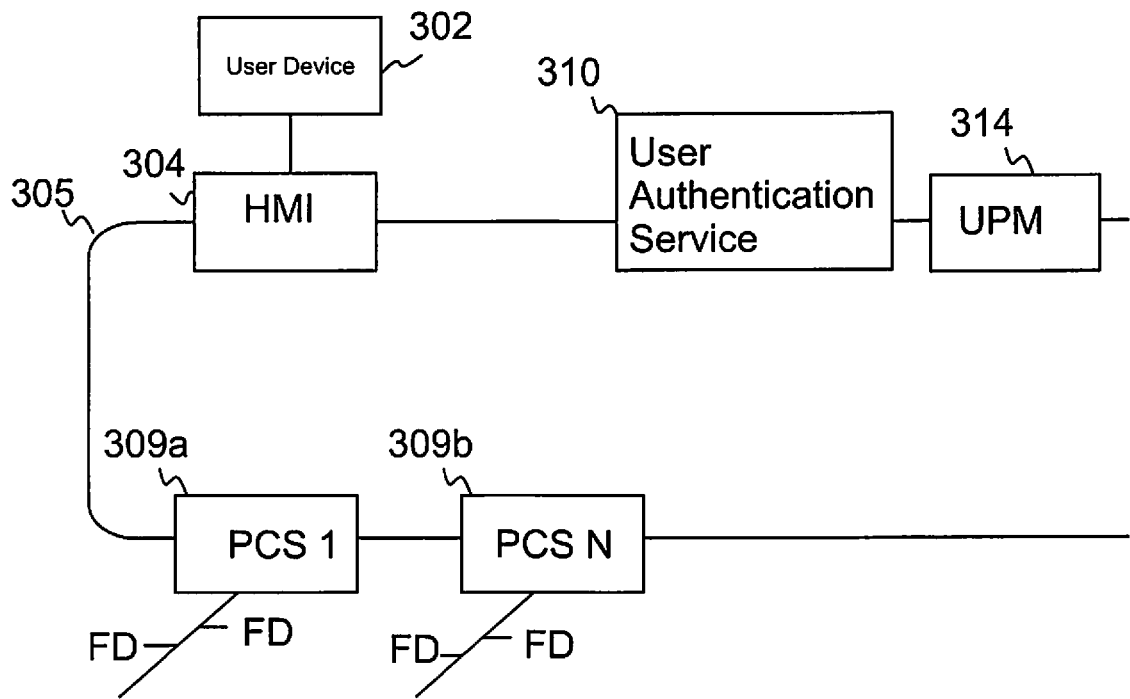
FIG. 3 shows schematically a part of a system architecture of an embodiment of an industrial automation system.

FIG. 3 shows schematically a part of a system architecture of an embodiment of an industrial automation system. The industrial automation system may comprise user interface components and process components. The user interface components may comprise an End-User Device (EUD) 302. The process components of the industrial automation network may comprise one or more process controllers 309a, 309b (PCs), for example referred to as Process Control Stations (PCSs). The EUD 302 may serve as a user interface for initiating a user session in the industrial automation system and for executing operations directed to a component of the industrial automation system. For authorizing operations directed to a component of the industrial automation system based on active roles of the user, the industrial automation system may comprise components for supporting the user interface components and process components. The supporting components may comprise for instance a user authentication service 310, a user and policy management (UPM) 314.

The components of the automation system may be operatively connected by one or more communications networks 305 and communications protocols for transfer of data between the components. The communications networks may comprise a user network for connecting the EUD 302 to other components of the industrial automation system and an industrial automation network for communications and control of the industrial process served by the industrial automation system. The networks may be based on the standard Internet Protocol over Ethernet technology.

The user network may be the network under whose service area the EUD may be located and where the industrial automation system, for example a human machine interface (HMI) server connected to the industrial automation system, may be discoverable to the EUD. The user network may be a public network such as the Internet.

The industrial automation network may be a private network. Compared to the public network, access to the industrial automation network may not be available to the public, but the access may be granted to personnel that have a direct role in the industrial automation system.

The End-User Device (EUD) 302 may be capable of displaying a graphical user interface to an operator. The EUD may be for example a computing device connected to a display or having an integrated display. The display may form a part of the user interface of the computing device. According to an embodiment, the user interface 102 may be provided on the end-user device 302. According to an embodiment, the graphical user interface 104 may be provided by one or more applications executed on the EUD 302 and cause displaying the user interface on the EUR 302. The applications may comprise a web browser, for example the Internet Explorer, Chrome, Safari or Mozilla Firefox. Also further applications may be executed independently or as plugins to provide additional features to the applications such as the web browser. The applications may be executed on an operating system running on the EUD. Examples of the operating systems include Windows operating systems, Linux and OSX.

The EUD may be capable of connecting to the industrial automation system for example via the HMI server 304. When the EUD is connected to the HMI, the HMI may provide the EUD a graphical user interface to the industrial automation system. The EUD and HMI may communicate using a client-server communications scheme, whereby one or more requests from the EUD may cause the HMI server to send data to the EUD such that the graphical HMI user interface is displayed in the EUD. According to an embodiment, the HMI server may comprise a WebHM1 server capable of providing the EUD the graphical user interface on a web browser executed in the EUD. The HMI server may store software components that may be delivered to the EUD for displaying the graphical user interface on the EUD. The software components may comprise one or more files that are executed separately or as components of one or more applications executed on the EUD such that the user interface may be displayed on the EUD.

Figure 4:
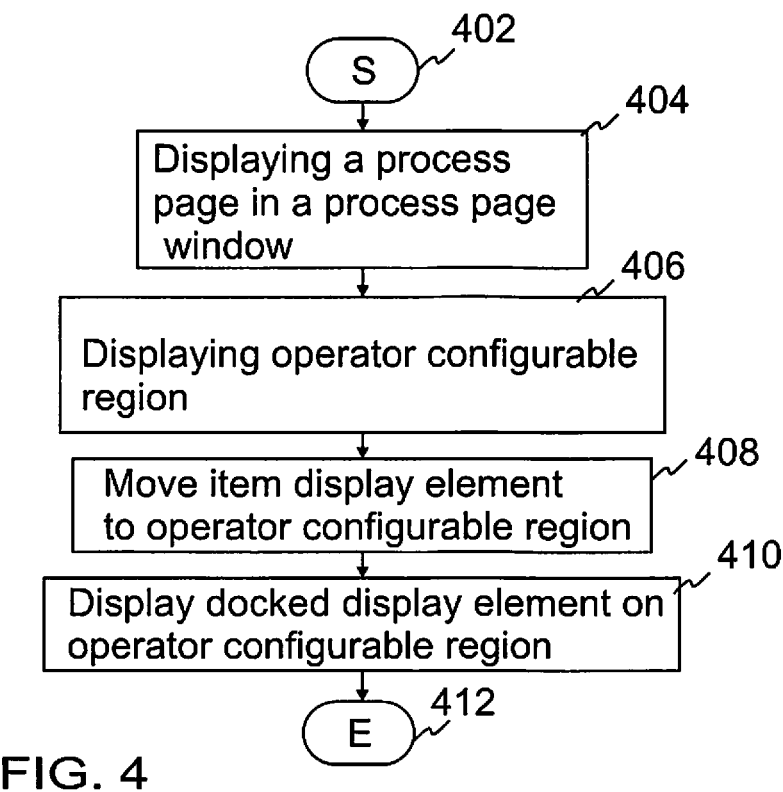
FIG. 4 shows schematically a method for monitoring and controlling an industrial process.

FIG. 4 shows schematically a method for monitoring and controlling an industrial process. In FIG. 4, the reference sign 402 refers to a start of the method and 412 refers to an end of the method.

The method for monitoring and controlling an industrial process may comprise displaying 404 at least one process page in a process page window 105, 106, 108 in a graphical user interface 104 of an industrial automation system. The method may further comprise providing 406 an operator configurable region arranged to be displayed on the graphical user interface. In other words, operator configurable region 110 and a process page window 105, 106, 108 may be presented on the graphical user interface 104 at the same time.

According to an embodiment, the operator configurable region may be configured to be displayed simultaneously with the process page window. According to an embodiment, the operator configurable region may be configured to be shown on the graphical user interface also when the process page window 105, 106, 108 is changed. This enables displaying simultaneously a process page window and docked display elements 30 representing item display elements 33 belonging to another process page window than the one currently shown in the operator configurable region 110 and/or displaying docked display elements 30 representing item display elements 33 belonging to different process page windows simultaneously in the operator configurable region.

According to an embodiment, the operator configurable region may also be displayed in the graphical user interface 104 alone independently from any process page window. This might be particularly beneficial in connection with mobile and handheld end user devices or other end user devices with limited display size. In such embodiments, the operator may configure the operator configurable region at one location and one end user device, such as at a work station or monitoring station, by selecting the item display elements 33 to be displayed in the operator configurable region and control the industrial process or a part, such as a process component, sub-process or operation thereof, remotely using the mobile and/or handheld end user device displaying the operator configurable region only to optimize the use of the display for the most critical parts to control.

The method may further comprise providing 408 at least one item display element 33 representing at least one process component, sub-process or operation of the industrial automation system on the process page and being movable on top of the operator configurable region 110 and determining a movement of the item display element from the process page on to the operator configurable region 110. In other words, a corresponding docked display element 30 may be received to the operator configurable region 110 by moving of an item display element 33 representing the same process component, sub-process or operation on to the operator configurable region 110.

The method may further comprise causing 410 the operator configurable region to display the docked display element 30 in the operator configurable region 110 in response to the item display element 33 being moved on to the operator configurable region. Preferably, moving the item display element 33 to the operator configurable region does not affect the process page window 105, 106, 108. In other words, adding the docked display element 30 representing a process component, sub-process or operation to the operator configurable region 110 does not remove the corresponding item display element 33 from the process page window 105, 106, 108. Instead, the corresponding item display element 33 may be shown simultaneously on the process page window 105, 106 and 108, if the process page window 105, 106, 108 comprising the item display element 33 is shown in the graphical user interface 104 at the same time with the operator configurable region 110 and the docked display element 30 provided in the operator configurable region 110. The appearance of a display element representing a process component, sub-process or operation of an industrial process may depend on whether it is an item display element 33 shown on a process page or a docked display element 30 shown in the operator configurable region and/or based on other parameters, such as selections made by the operator. In other words, an item display element 33 and a docked display element 30 representing the same process component, sub-process or operation may comprise several alternative appearances, such as an icon, a thumbnail, a meter representing the process component, sub-process or operation or some other appearance. The appearance of the item display element 33 and the docked display element 30 representing the same process component, sub-process or operation may also differ on the basis of the operator having activated or not having activated the display element or other selections made by the operator, for example.

According to an embodiment, moving the item display element 33 on to the operator configurable region may comprise for instance dragging and dropping the item display element 33 from the process page window onto the operator configurable region 110, first selecting an item display element 33 and then affecting a content selection element 31 provided in the operator configurable region to add a docked display element 30 representing the selected item display element 33 on to the operator configurable region, or affecting a content selection element (not shown) provided in connection with the item display element 33 to add the docked display element 30 representing the selected item display element 33 on to the operator configurable region. The content selection element may comprise for example an icon, such as a plus sign, and affecting the content selection element may cause a selected item display element 33 or the item display element 33 associated with the content selection element to be added on to the operator configurable region 110 to be displayed in the operator configurable region as a docked display element 30.

According to an embodiment, the docked display element 30 may comprise an icon or a thumbnail of a docked faceplate of a process component to the industrial process 101. Such faceplates and docked faceplates are discussed in more detail in connection with FIGS. 6 to 10, for example.

The docked display element 30 may be configured to enable control of the process component, sub-process or operation of the industrial automation system the docked display element represents from the operator configurable region. In other words, the graphical user interface 104 may enable the operator to control the industrial process 101 using the docked display element 30 representing the process component, sub-process or the operation to be controlled shown in the operator configurable region 110. This is beneficial, as the operator may select which docked display elements 30 representing process components, sub-processes and/or operations of the industrial automation system are shown in the operator configurable region.

The operator can, thus, select for instance docked display elements related to a certain work flow, such as starting or stopping an industrial process or sub-process, to an operator configurable region for easy control of the work flow. Alternatively, the operator can, select for instance the docked display elements representing the most critical process components, sub-processes or operations to control to an operator configurable region to easy monitoring and control of those process components, sub-processes or operations.

According to an embodiment, the process page window 105, 106, 108 may be configured to rescale automatically when the operator configurable region 110 is displayed and/or its size is changed. Thereby, it may be ensured that the content shown in the process page window 105, 106, 108 does not change or become covered by the operator configurable region 110. In other words, the operator configurable region 110 does not cover any process components, subprocesses and/or operations of the industrial automation system shown on the process page window 105, 106, 108, but the process page window 105, 106, 108 is rescaled such that all its content remains visible to the end user despite the operator configurable region 110 being displayed simultaneously. An example of rescaling of a process page window is shown FIGS. 9 and 10.

According to an embodiment, the user interface 102 may comprise multiple operator configurable regions 110, one or several of which may be shown in the graphical user interface 104 simultaneously. According to an embodiment, such operator configurable regions 110 and their configurations, such as information about docked display elements included to be shown in the operator configurable region, may be stored in the memory. In such embodiment, the operator configurable regions may then be retrieved from the memory when they are needed for controlling the industrial process 101.

Figure 5:
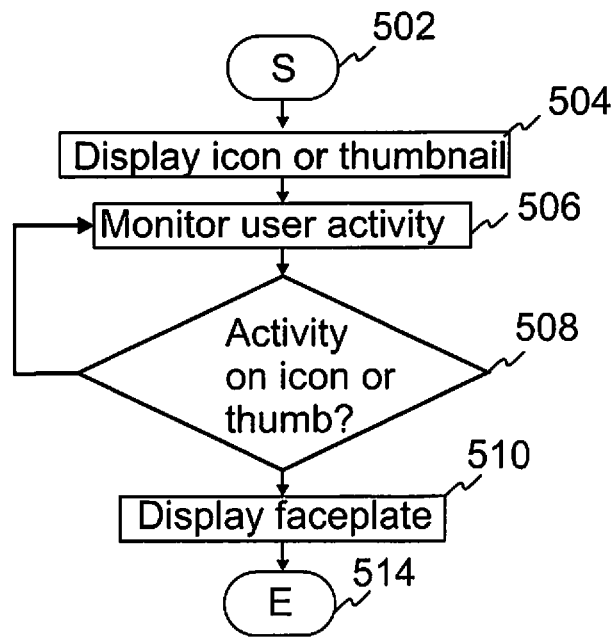
FIG. 5 shows schematically a method in connection with monitoring and controlling an industrial process.

FIG. 5 shows schematically a method in connection with monitoring and controlling an industrial process. In the method of FIG. 5, the reference sign 502 refers to a start of the method and 514 refers to an end of the method. According to an embodiment, the method of FIG. 5 may be used for receiving 408 docked display element 30 to the operator configurable region 110 according to FIG. 4.

In the method of FIG. 5, the docked display element 30 may comprise an icon or a thumbnail representing the process component, sub-process or operation. According to an embodiment, the method of FIG. 5 may be used to for utilizing the operator configurable region and the graphical user interface 104 for controlling the industrial process 101.

In the method of FIG. 5, the user interface 102 may be configured to monitor 506 user activity and to detect 508 activity of the operator on the icon or the thumbnail. The user activity may be monitored until activity is detected. The graphical user interface 104 may then be configured to display a faceplate of the process component, sub-process or operation represented by the docked display element 30, namely the icon or the thumbnail, in response to the operator affecting the icon or the thumbnail. According to an embodiment, the docked display element 30 may comprise a docked faceplate. For instance, the thumbnail may comprise a thumbnail of the faceplate. The size of the docked faceplate may be adjusted to fit in the reserved space within the operator configurable region 110, to enable the separate the process components, sub-processes or operations the docked display element represent and/or to show the most important information related to the process component, sub-process or operation the faceplate is associated with. The faceplate displayed by the graphical user in response to the detected user activity may comprise the full-sized faceplate 32, as illustrated in the FIG. 5, for example, which is called a faceplate only in this description for simplicity's sake. According to an embodiment, operator may be enabled to adjust the size of the operator configurable region 110. According to an embodiment, the size of the docked faceplate may depend on the size of the operator configurable region, whether it is automatic or operator adjustable. According to an embodiment, the size of the docked faceplate may be equal to the size of the full-sized faceplate 32, unless the size of the operator configurable region 110 is adjusted or compressed to make scale it smaller.

Figure 6:
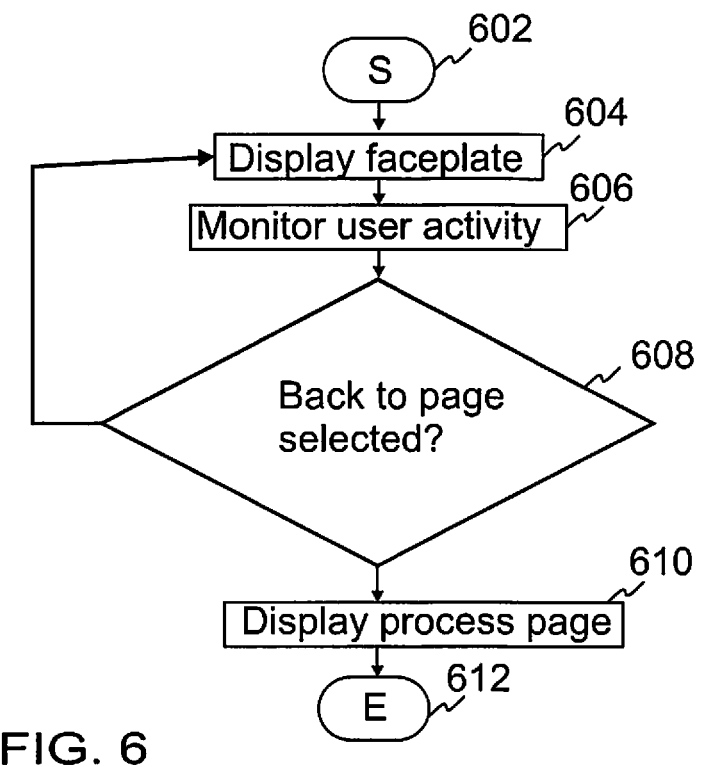
FIG. 6 shows schematically another method in connection with monitoring and controlling an industrial process.

FIG. 6 shows schematically another method in connection with monitoring and controlling an industrial process. In the method of FIG. 6, the reference sign 602 refers to a start of the method and 612 refers to an end of the method. According to an embodiment, the method of FIG. 6 may be used for utilizing the operator configurable region and the graphical user interface 104 for controlling the industrial process 101.

In the method of FIG. 6, a faceplate 32 may be displayed 604. According to an embodiment, the faceplate may be displayed in response to the detecting 508 activity of the operator on the icon or the thumbnail in a method similar to that of FIG. 5. The user interface may then be configured to monitor 606 user activity on the faceplate and to display 610 a process page in response to detecting user activity affecting the faceplate or a content selection element associated with it. Depending on operator selection by affecting a content selection element, the graphical user interface may be configured to close the faceplate and return to the previous process page or to open a process page the faceplate is associated with, for instance a process page comprising the process component, sub-process or operation the faceplate represents or is associated with in some other manner.

Figure 7:
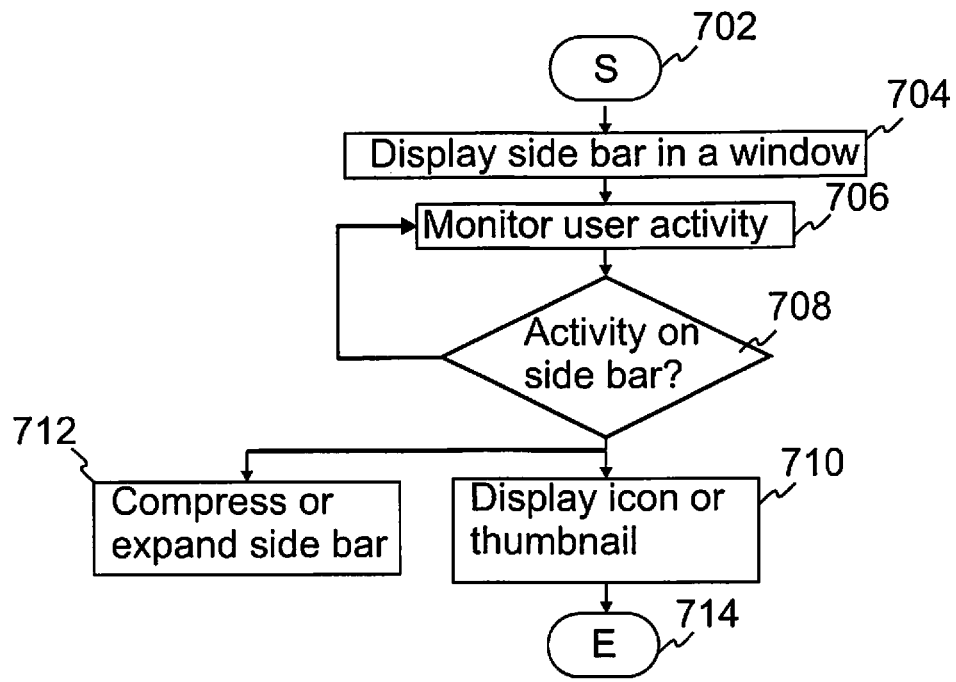
FIG. 7 shows schematically a yet another method in connection with monitoring and controlling an industrial process.

FIG. 7 shows schematically yet another method in connection with monitoring and controlling an industrial process. In the method of FIG. 7, the reference sign 702 refers to a start of the method and 714 refers to an end of the method. According to an embodiment, the method of FIG. 7 may be used for utilizing the operator configurable region and the graphical user interface 104 for controlling the industrial process 101.

Figure 9:
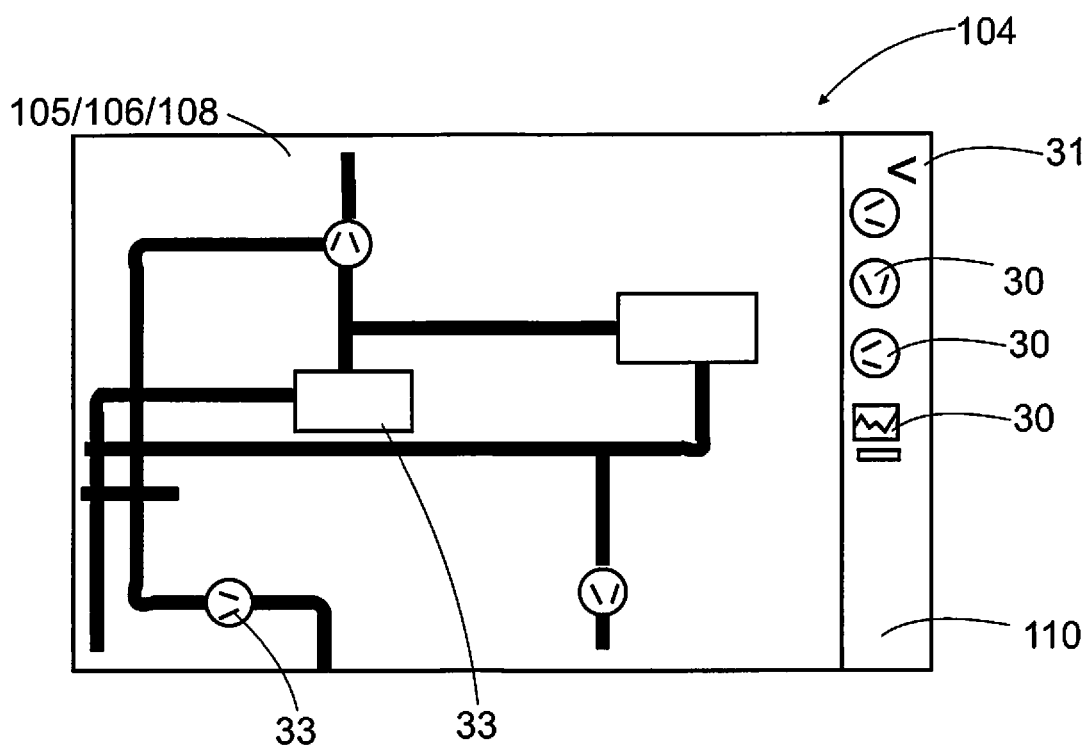
Figure 10:
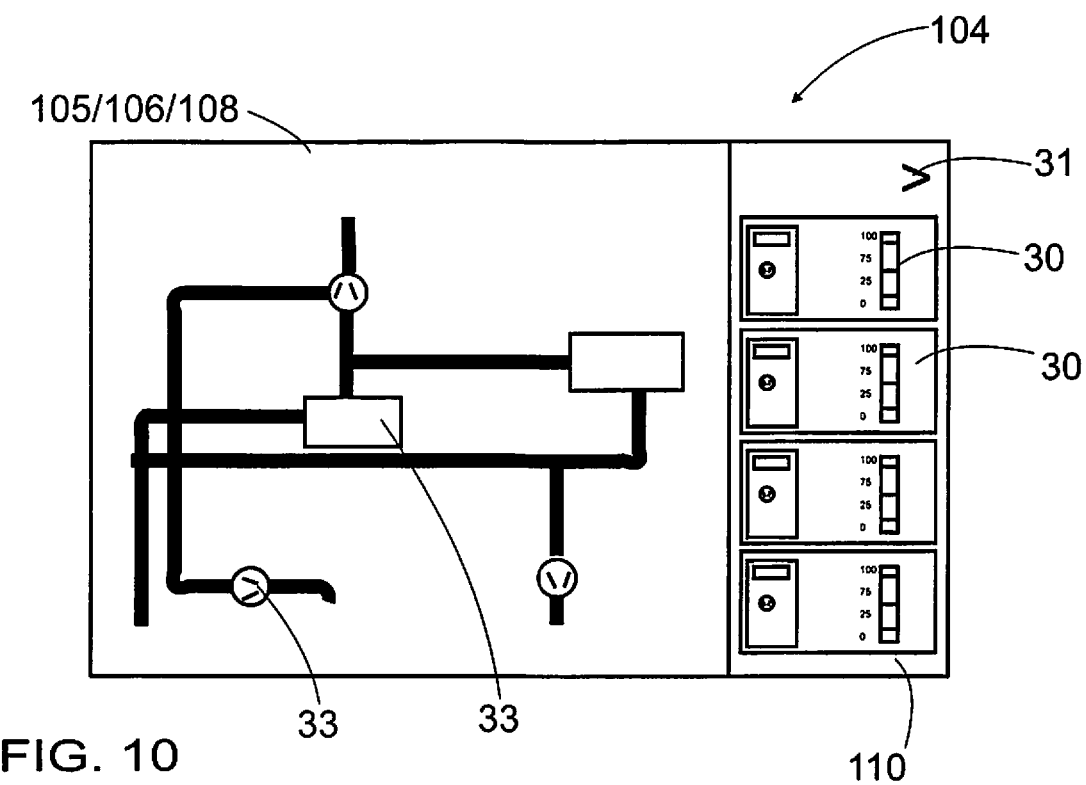

In the method of FIG. 7, the operator configurable region 110 comprises a sidebar and the sidebar is displayed 704 in a process page window 105, 106, 108 in an industrial automation system. User activity is monitored 706 and the sidebar may be compressed or expanded 712 and/or an icon or a thumbnail may be displayed 710 in response to the detection of user activity on the sidebar. According to an embodiment, the sidebar may be compressed or expanded in response to the detection of user activity on the sidebar depending on the prevailing status of the sidebar, in other words whether the sidebar is compressed or expanded at the time of detection of the user activity. According to another embodiment, the sidebar may be compressed or expanded in response to the detection of user activity on the sidebar depending on the type of user activity detected, such as based on the way the user affect the side bar. According to another embodiment, the sidebar may be compressed or expanded in response to the detection of user activity on a specific selection element of the graphical user interface 104, such as the user affecting a display mode selection element. An embodiment of a compressed sidebar is shown in FIG. 9 and an embodiment of an expanded sidebar is shown in FIG. 10, but these are just some examples and the content and the size of the compressed and expanded sidebar view may vary based on the embodiment.

FIGS. 8, 9, 10 and 11 show schematically different views and embodiments of user interfaces of an industrial automation system for monitoring and controlling the industrial process. Such user interfaces 102 may be used for implementing methods and controlling industrial automation systems disclosed in this description. Similarly, methods for monitoring and controlling an industrial process may comprise steps and features disclosed in connection with the user interfaces.

A user interface 102 of an industrial automation system for monitoring and controlling the industrial process may comprise at least one process page arranged to be displayed in a process page window 105, 106, 108 in an industrial automation system. The user interface 102 may further comprise an operator configurable region 110 arranged to be displayed on a graphical user interface 104. At least one item display element 33 representing process components, sub-processes and/or operations of the industrial automation system in the process page may be movable on to the operator configurable region 110 to be displayed as a docked display element 30. According to an embodiment, the docked display element 30 may comprise a docked faceplate of a process component that has already been opened for monitoring in the process page window 105, 106, 108, for instance by affecting an area of the process page window representing the process component.

According to an embodiment, the operator configurable region 110 may be caused to display the docked display element 30 in the operator configurable region, when the corresponding item display element 33 is moved on to the operator configurable region. The docked display element may be configured to enable control of the process component, sub-process or operation of the industrial automation system the docked display element represents from the operator configurable region. According to an embodiment, the operator configurable region 110 may be displayed simultaneously with the process page window on the graphical user interface.

According to an embodiment, the operator configurable region 110 may be configured to display simultaneously a plurality of docked display elements 30 representing process components, sub-processes or operations from different process pages. This is beneficial as the operator can see all the relevant display elements as docked display elements 30 at the same time without a need to scan through the different process page windows.

According to an embodiment, the operator configurable region 110 may have two display modes comprising a compressed mode and an uncompressed mode. A display mode selection element capable of being selected by an operator may be provided for changing the display mode of the operator configurable region between the compressed mode and the uncompressed mode. This is particularly beneficial if there is a need for focusing on a process page window for a while and/or when an end user device with a display of limited size is used. According to an embodiment, the display mode selection element may comprise the content selection element 31. According to an embodiment, the docked display elements 30 may comprise docked faceplates in the uncompressed mode, also called the expanded mode, and icons or similar in the compressed mode.

According to an embodiment, the content selection element 31 may be affected by clicking the or touching the area of the content selection element 31, by hovering over the content selection element 31, a gesture, voice command or other way of interacting with the content selection element 31. According to an embodiment, a similar action as is explained in connection with the content selection element may be implemented in response to clicking the or touching the area of the operator configurable area 110, by hovering over the operator configurable area, a gesture, voice command or other way of interacting with the operator configurable area 110.

According to an embodiment, a faceplate of the process component is caused to be displayed in response to docked display element representing the component on the operator configurable region being activated by the operator. According to a further embodiment, the faceplate, docked display element or the operator configurable region may comprise a view selection element that when selected by a user causes displaying a process page comprising the item display element 33 represented by the docked display element 30, as well as related process component(s), sub-process(es) and/or operation(s). In other words, a view selection element may be provided in connection with a faceplate, a docked display element 30 or the operator configurable region 110 to enable displaying the item display element 33 represented by the docked display element 30 in connection with which the view selection element is provided, an item display element 33 represented by the selected docked display element or an item display element 33 associated with the faceplate in response to the operator affecting the view selection element. According to an embodiment, the view selection element may comprise the content selection element 31.

According to an embodiment, activation by the operator may be determined on the basis of the user entering a command on the user interface, or on the basis of the icon or thumbnail being located in an interest area of the user. According to an embodiment, the activation by the operator may be determined by the end user giving audible command or a command by a gesture or a motion detectable by the user interface 102.

According to an embodiment, the operator configurable region may have a content selection element 31 that when selected by the user causes displaying the components, sub-processes or operations represented by the item display elements 33 selected to be displayed in the operator configurable region by icons or thumbnails.

According to an embodiment, the operator configurable region may be arranged to an edge of the process page window of the graphical user interface. Thus, the operator configurable region may be provided on top, on the bottom or at a side of the process page window 105, 106, 108. According to an embodiment, the operator configurable region may be arranged at a position other than an edge of the process page window, such as placed at least partly on top of the process components, sub-processes or operations illustrated in the process page window 105, 106, 108. According to another embodiment, the operator configurable region may be displayed independently from any process page window 105, 106, 108. It should be noted that while the operator configurable region 110 comprises a side bar and is, thus, provided on the left or right edge of the process page window of the graphical user interface in FIGS. 8, 9 and 10, this does not limit the possible positions of the operator configurable region 110 in the graphical user interface.

Figure 8:
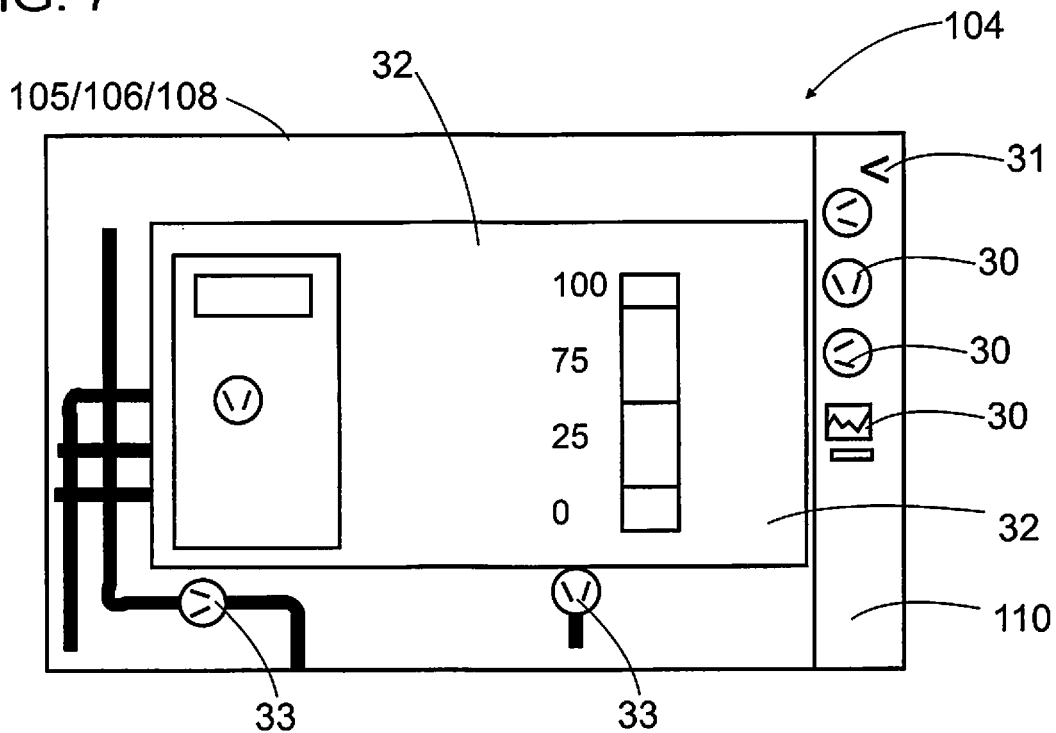
FIGS. 8, 9, 10 and 11 show schematically different views and embodiments of user interfaces of an industrial automation system for monitoring and controlling the industrial process.

FIG. 8 illustrates a view where one of the docked display elements 30 has been activated or affected to open a faceplate 32 related to the process component, sub-process or operation the docked display element represents. In this embodiment, the operator configurable region 110 and the faceplate 32 are shown on top of a process page window 105, 106 or 108. The docked display elements 30 may comprise icons, schematic illustrations of states of the process component, sub-process or operation they represent or figures, graphs or charts illustrating the states of the process component, sub-process or operation they represent.

FIG. 9 illustrates a view where a process page window 105, 106, 108 and the operator configurable region 110 are shown simultaneously in the graphical user interface 104. FIG. 10 illustrates a view where the docked display elements 30 comprise thumbnails of faceplates of the process component, subprocess or operation the docked display element represents, which thumbnails of faceplates are also called docked faceplates in this description. According to an embodiment, the content of the docked display element 30, such as the icon, the schematic illustration of the state of the process component, sub-process or operation they represent or the figure, graph or chart illustrating the state of the process component, sub-process or operation the docked display element represents are updated in real time, if the data related to the docked display element has changed or at predetermined intervals.

Figure 11:
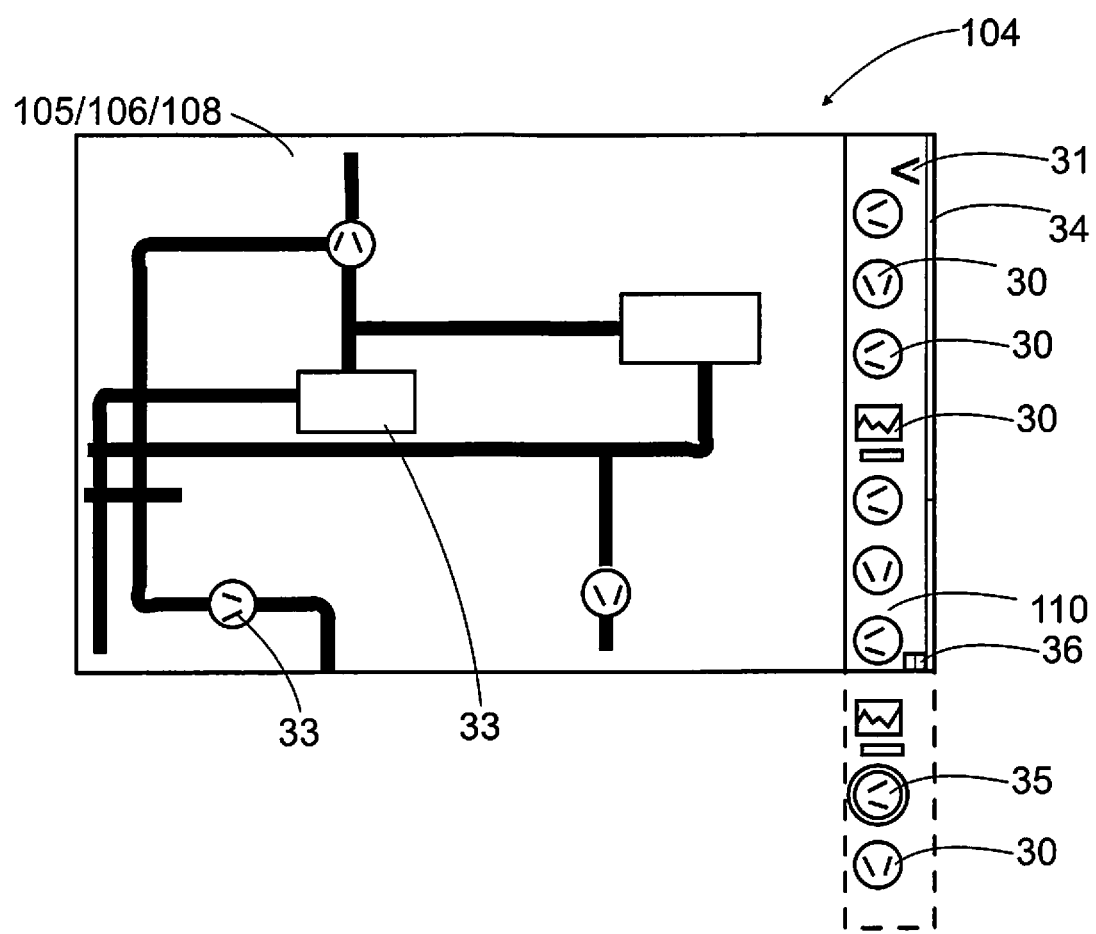

FIG. 11 illustrates a view where the operator configurable region 110 comprises more docked display elements 30, such as icons or docked faceplates, than can be shown simultaneously. the operator configurable region 110 may be in a compressed or non-compressed/expanded mode, when this takes place. According to an embodiment, some of the docked display elements 30 may then be hidden, which is illustrated by an area defined by a dashed line in the embodiment of FIG. 11. In other words, only a selection of the docked display elements 30 can then be shown at a time. According to an embodiment, a scroll bar 34 can be displayed in response to the operator configurable region 110 comprising more docked display elements 30 than can be shown at a time. The scroll bar 34 enables the user to scroll the content of the operator configurable region 110 up and down to show all the docked display elements 30.

According to an embodiment, a docked display element with an alarm 35, in other words a docked display element 30 which requires special attention due to an unusual situation, measurement value or similar, may cause appearance of the operator configurable region 110 to change. According to an embodiment, this change may comprise changing the visual appearance of the operator configurable region 110, such as the colour of the operator configurable region 110 or making the operator configurable region 110 blink or similar. According another embodiment, the change may comprise adding an alarm element 36 to the operator configurable region 110. According to an embodiment, affecting the alarm element 36 may cause the content of the operator configurable region 110 to scroll to show the docked display element with the alarm 35.

According to an embodiment, a docked display element with an alarm 35 may cause the content of the operator configurable region 110 to scroll automatically in such a manner that the docked display element with an alarm 35 is shown in the graphical user interface 104. In other words, the content of the operator configurable region 110, such as the docked display elements 30, may be scrolled automatically in response to detecting an alarm related to at least one of the docked display elements 30 that is not visible in the graphical user interface 104 at the time of the alarm takes place.

An industrial automation system, such as an industrial automation system of FIG. 1, may comprise one or more process pages each comprising components, sub-processes and/or operations of the industrial automation system and a user interface of the industrial automation system for displaying at least one process page in a process page window. The user interface may comprise an operator configurable region, wherein item display elements 33 representing components of the automation system in the process page are movable on to the operator configurable region. The operator configurable region may be caused to display the corresponding docked display element in the operator configurable region 110. The docked display element 30 may be configured to enable control of the process component, sub-process or operation of the industrial automation system the docked display element represents on the operator configurable region. In other words, the docked display element 30 itself may enable control of the related industrial process or a part thereof without a need for finding and opening a process page window comprising the process component, sub-process or operation.

In different embodiments, the operator configurable region 110 may be positioned on at least one edge of a process page window 105, 106, 108, such as on top, on the bottom and/or at a side of a process page window 105, 106, 108. According to an embodiment, the location of the operator configurable region may be fixed. According to another embodiment, the location of the operator configurable region 110 on the process page window 105, 106, 108 may be altered, for instance by dragging and dropping the operator configurable region 110 on the process page window 105, 106, 108 in response to a command given by the operator by an input device of the user interface 102, such as a mouse connected to the control unit, by numerically defining in a selection menu the location of the operator configurable region 110 in the process page window 105, 106, 108, by audio command, or by gesture or motion command.

The graphical user interface 104 may be configured to display at least one docked display element 30 representing one process component 109, subprocess 107 or operation for enabling control of the respective one process component 109, sub-process 107 or operation in the operator configurable region 110 in response to the operator moving the at least one docked display element 30 to be included on to the operator configurable region 110, such as dragging and dropping the corresponding item display element 33 on top of the operator configurable region or a portion thereof.

According to an embodiment, at least one of a size and shape of the operator configurable region 110 may be changeable in response to an operation of the operator to change the at least one of the size and shape of the operator configurable region 110. The size and/or shape of the operator configurable region 110 may be changed or altered by gripping with a pointer of the mouse to a side or a corner of the operator configurable region 110 and dragging thereafter the pointer along the respective process page window 105, 106, 108, or by numerically defining in a selection menu the size and/or shape of the operator configurable region 110 in the process page window 105, 106, 108.

According to an embodiment, a content of the operator configurable region 110 may be configured to be updated in response to an operation of the operator to update the content of the operator configurable region 110. In this embodiment, the update of the content of the operator configurable region 110 may comprise a change in the subject matter to be displayed in the operator configurable region 110 or updating the content of the information to display the newest information about the subject matter which the operator configurable region 110 is determined to display.

The information to be displayed in the operator configurable region 110 may comprise various process data. The process data may describe for example measurement information related to the industrial process 101, subprocess 107 or process component 109. The process data may also describe for example setup information relating to the industrial process 101, sub-process 107 or process component 109. The process data may also describe for example control information relating to the industrial process 101, sub-process 107 or process component 109. The process data may also describe for example notes relating to the industrial process 101, sub-process 107 or process component 109.

The process data may also describe for example alarm information relating to the industrial process 101, sub-process 107 or process component 109. The process data may also be enhanced process data that is derived from the process. This kind of data may be KPI (Key Performance Indicator) or condition information.

An alarm information may comprise a visual representation of an alarm chain of interdependent alarms taken place in the industrial process 101, sub-process 107 or process component 109. The visual representation of the alarm chain of the interdependent alarms may comprise a number of successive pointers, wherein each pointer starts from a position of the industrial process 101, sub-process 107 or process component 109 where the at least one malfunction initiating the alarm was appeared and ending to a position of the industrial process 101, sub-process 107 or process component 109 where the malfunction initiating the first alarm initiated at least one subsequent second alarm.

It will be obvious to a person skilled in the art that, as the technology advances, the inventive concept can be implemented in various ways. The invention and its embodiments are not limited to the examples described above but may vary within the scope of the claims.

The invention claimed is:

1. A method for monitoring and controlling an industrial process, the method comprising:
    displaying at least one process page in a process page window in a graphical user interface of an industrial automation system,
    providing an operator configurable region arranged to be displayed on the graphical user interface,
    providing at least one item display element representing at least one process component, sub-process or operation of the industrial automation system on the process page and being movable on top of the operator configurable region,
    determining a movement of the item display element from the process page on to the operator configurable region, and
    causing the operator configurable region to display a corresponding docked display element in the operator configurable region in response to the item display element being moved on to the operator configurable region,
    wherein the docked display element is configured to enable control of the process component, sub-process or operation of the industrial automation system the docked display element represents using the docked display element in the operator configurable region.

2. The user interface according to claim 1, wherein the process page window is configured to being rescaled automatically in response to the operator configurable region being displayed and/or the size of the operator configurable region being changed.

3. The method according to claim 1, wherein the docked display element is a plurality of docked display elements each including a thumbnail of a faceplate of the process component, sub-process or operation the respective docked display element represents.

4. A user interface of an industrial automation system for monitoring and controlling the industrial process, comprising:
    at least one process page arranged to be displayed in a process page window in an industrial automation system, and
    an operator configurable region arranged to be displayed on the graphical user interface, wherein at least one item display element representing process components, sub-processes and/or operations of the industrial automation system in the process page are movable on to the operator configurable region, and the operator configurable region is caused to display a corresponding docked display element in the operator configurable region, when the item display element is moved on to the operator configurable region, wherein the docked display element is configured to enable control of the process component, sub-process or operation of the industrial automation system the docked display element represents using the docked display element in the operator configurable region.

5. The user interface according to claim 4, wherein the operator configurable region is configured to be displayed simultaneously with the process page window on the graphical user interface.

6. The user interface according to claim 4, wherein the operator configurable region is configured to display simultaneously a plurality of docked display elements representing process components, sub-processes or operations from different process pages.

7. The user interface according to claim 4, wherein the operator configurable region has two display modes comprising a compressed mode and an uncompressed mode and a display mode selection element capable of being selected by an operator for changing the display mode of the operator configurable region between the compressed mode and the uncompressed mode.

8. The user interface according to claim 4, wherein a faceplate of the process component is caused to be displayed in response to the docked display element representing the process component on the operator configurable region being activated by an operator.

9. The user interface according to claim 8, wherein the faceplate, docked display element or the operator configurable region comprises a view selection element that when selected by a user causes displaying a process page comprising the process component, sub-process or operation represented by the docked display element.

10. The user interface according to claim 8, wherein activation by a user is determined on the basis of the user entering a command on the user interface, or on the basis of an icon or thumbnail being located in an interest area of the user.

11. The user interface according to claim 4, wherein the operator configurable region has a content selection element that when selected by a user causes displaying the components, sub-processes or operations represented by the docked display elements selected to be displayed in the operator configurable region by icons or thumbnails.

12. The user interface according to claim 4, wherein the operator configurable region is arranged to an edge of the process page window of the graphical user interface.

13. The user interface according to claim 4, wherein the docked display element is a plurality of docked display elements each including a thumbnail of a faceplate of the process component, sub-process or operation the respective docked display element represents.

14. An industrial automation system comprising one or more process pages each comprising components, sub-processes and/or operations of the industrial automation system and a user interface of the industrial automation system for displaying at least one process page in a process page window, wherein the user interface comprises:
an operator configurable region, wherein item display elements representing components of the automation system in the process page are movable on to the operator configurable region, and the operator configurable region is caused to display a corresponding docked display element in the operator configurable region, wherein the docked display element is configured to enable control of the process component, sub-process or operation of the industrial automation system the docked display element represents using the docked display element in the operator configurable region.

15. The industrial automation system according to claim 14, wherein the docked display element is a plurality of docked display elements each including a thumbnail of a faceplate of the process component, sub-process or operation the respective docked display element represents.

\* \* \* \* \*